Dec. 31, 1940. H. T. DOW 2,227,300
VEHICLE SPRING
Original Filed Oct. 28, 1937
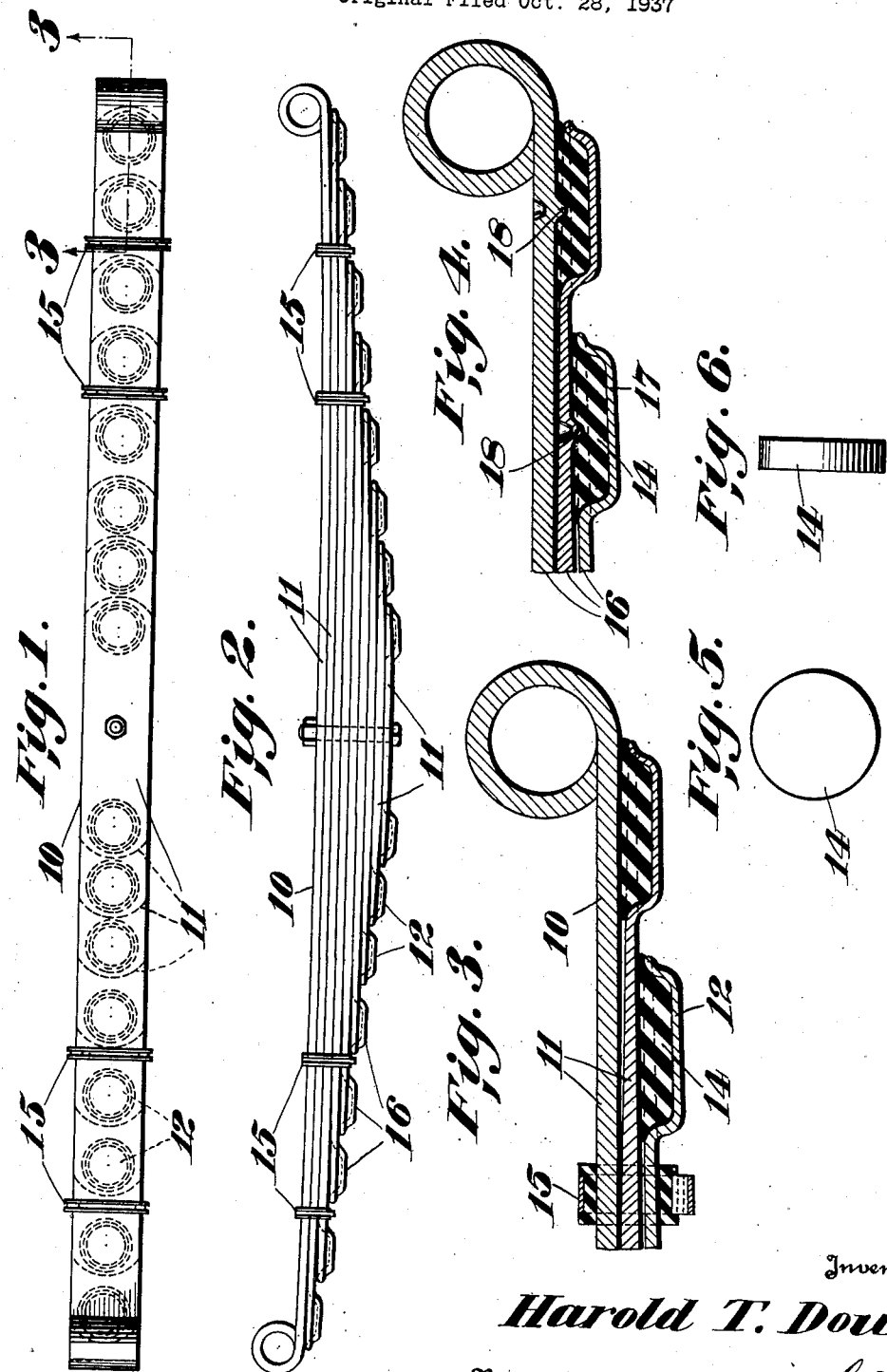
Inventor
Harold T. Dow.
By R. S. C. Dougherty.
Attorney Patented Dec. 31, 1940

2,227,300

UNITED STATES PATENT OFFICE 2,227,300

VEHICLE SPRING

Harold T. Dow, Elma, N. Y., assignor to Spring Perch Company, Inc., a corporation of New York Continuation of application Serial No. 171,505, October 28, 1937. This application June 9, 1939, Serial No. 278,365

4 Claims. (Cl. 267—47)

This invention relates to vehicle springs of the multi-leaved elliptic type particularly useful in vehicles, and is a continuation of my United States application, Serial No. 171,505, filed October 28, 1937.

The principal object of the invention resides in the provision of a new and improved spring and method of calibrating the same to secure a predetermined dampening effect thereby providing a desired reaction from deflection under specific load.

The said principal object of the invention is attained by use of inserts between the leaves to relieve the same from high static pressure between contiguous leaves at their free ends and through variation in the length of the contiguous leaves providing a certain area of frictional contact between contiguous leaves, the insert being of a character to eliminate friction at the insert.

It has heretofore been the common practice to provide inserts between leaves of multi-leaved springs but in the arrangement of parts as hereinafter described the inserts are of such character as to provide a peripheral and laterally unconfined flange between the leaves and by use of different length of the leaves the area of the several leaves in surface contact may be varied to provide a predetermined dampening factor. By use of a rubber insert between contiguous leaves it may flow or yield in the flexing of the leaves thereby eliminating friction between the insert and the leaf in contact therewith.

By thus eliminating friction between the inserts and the leaves and by use of leaves of various lengths from the point of fixed contact separated at the ends by inserts I have found it possible to vary the leaf area in frictional contact by which, as hereinafter more fully described, a multi-leaved vehicle spring may be accurately calibrated to secure predetermined reaction from deflection under specific load.

These and other objects and features of the invention are hereinafter more fully described and claimed and a multi-leaved spring embodying my invention is shown in the accompanying drawing in which—

Fig. 1 is a plan view of one form of my improved multi-leaved spring structure.

Fig. 2 is a side elevation thereof.

Fig. 3 is a sectional view taken on line 3—3 of Fig. 1.

Fig. 4 is a similar sectional view showing a modified spring structure embodying my invention.

Fig. 5 is a plan view of an insert.

Fig. 6 is a side elevation of the insert.

The invention relates particularly to multi-leaved springs of the elliptic type particularly adapted for use in automotive vehicles and the term "elliptic type" or elliptic as hereinafter used is intended to refer to the character of the spring such as is shown in Fig. 2 in side elevation and the leaves secured together in fixed relation centrally between the ends thereof or two such half elliptic springs may be joined at their ends with the concave faces in opposed relation or the spring may be one-half the length of the spring shown in Fig. 2, the ends thereof being secured together as by the bolt shown in Fig. 2 and forming a quarter elliptic spring. Thus, the spring embodying my invention may be full elliptic, half elliptic, or quarter elliptic.

In the drawing 10 designates a half elliptic spring structure formed of a plurality of similar springs 11 of different lengths and having depressions or recesses 12 thereon adjacent the outer end and of less diameter than the width of the leaves. These recesses are preferably circular in form in which are mounted cylindrical rubber inserts 14. These recesses and the inserts for mounting therein may be other than round and whether round or of other form they may vary in size to provide greater or less area of insert in contact with the under side of the leaves in engagement therewith.

The length of the inserts 14 transversely of the leaves is greater than the depth of the recesses in which they are mounted and when the leaves with the inserts in place are assembled and secured together at a predetermined point, as for instance by the bolt shown at the center of Fig. 2, the inserts are compressed and provide a flange of rubber between the leaves and separating contiguous leaves for a distance from their ends toward the point of fixed contact as is indicated in Fig. 3. The shorter the length of the leaf from the point of fixed contact the less will be the area of the adjacent leaves in frictional contact. Conversely the longer the leaves from the point of fixed contact the greater will be the area of separation and, while the inserts may be all of the same length and providing the same thickness of rubber flange, the variation in the length of the leaves with a said uniform thickness of flange between the successive leaves in contact enables the spring to be accurately calibrated to secure the desired reaction from deflection under specific load.

In the spring here shown, rubber lined clips 15 are provided for maintaining the several leaves from relative lateral displacement but other means may be provided for this purpose, as is indicated in the modified spring structure shown in Fig. 4. In the modified structure, the leaves 16 have recesses or depressions 17 therein adjacent the ends thereof within which the discs 14 are mounted and separating the successive pairs of leaves at their ends in the same manner as above described relative to Fig. 3. The under side of each of the leaves in the modified structure is provided with nibs or projections 18 which, due to the pressure contact of the leaves in assembly, is embedded in the upper face of the discs and tends to retain the leaves in parallel relation. The preferable arrangement, however, is shown in Fig. 3 but, in either case, in the flexing of the leaves through deflection under load and from shock imparted thereto by the wheel of the vehicle encountering road obstructions, the leaves have a limited sliding contact in the surfaces thereof in actual contact but at the insert there is no friction developed due to the yielding of the insert. By use of the insert the area of high static pressure is determined by the length of the insert transversely of the leaves and the distance of the insert from the point of fixed contact between the leaves.

It is also obvious that the body of the insert may be varied in cross sectional area and in form, it being desirable to increase the cross section area for use with spring leaves of greater width and thickness for heavier loads and to decrease the same for use with leaves of less width and/or thickness for lighter loads.

However, the principle involved in the utilization of the inserts remains the same. It is also pointed out that the invention is adapted for use between the leaves of a multi-leaved elliptic spring in any of the known forms.

The preferred composition used in formation of the inserts should be held closely to the following specifications; namely, black rubber stock or uniform hardness, the hardness at room temperature being from 63 to 67 and at zero temperature F. 75 maximum on Shore durometer. The material should have a tensile strength of approximately 3200 pounds per square inch, an elongation of 600 per cent, and a compression set test equal to 400 pounds pressure per square inch on the rubber section used in an oven at 158 degrees F. for twenty-two hours, the dimension being taken approximately ten minutes after removal from the oven set test not to exceed 6 per cent of the dimension.

While the invention is not limited to use of inserts of this specification, such black rubber stock has proven the most desirable stock for use as an insert in the arrangement herein described.

Having thus fully described my new and improved spring structure what I claim and desire to secure by Letters Patent of the United States is—

1. A leaf spring assembly comprising a plurality of leaves secured together at a point distant from their ends, one leaf of each successive pair of leaves having a depression adjacent the end thereof in the surface facing the other, the outer portion of each depression being flared, a bearing element in each of the depressions formed of yieldable rubber of a thickness greater than the depth of the depression and providing under pressure of the assembled leaves a laterally unconfined flange of rubber beyond said flared portion of the extending depression to the opposed leaf surfaces and separating the said leaves for a distance from their free ends and thereby determining the area in frictional contact therebetween.

2. A leaf spring assembly comprising a plurality of leaves, at least one of said leaves having a depression in one face thereof, the outer portion of said depression being flared, and a bearing element of rubber in said depression compressed and deformed by the next adjacent leaf to fill said depression and form a flange of rubber beyond said flared portion of the depression and between the said leaves of the spring.

3. A spring structure comprising a plurality of superimposed leaves having their central portions in clamped relation and having their end portions depressed outwardly to form depressions therein and rubber separators for the end portions disposed within the said depressions and nibs projecting from the leaves into said separators.

4. A spring structure comprising a plurality of leaves overlying one another, certain of said leaves having recesses formed therein adjacent their ends and intermediate their edges and rubber inserts within said recesses and extending a limited distance beyond the surfaces of the respective leaves into engagement with the adjacent leaves to separate the ends of the adjacent leaves and nibs projecting from the leaves into said inserts to resiliently connect the ends of said adjacent leaves.

HAROLD T. DOW.